US012739108B2

(12) United States Patent
Bezbaruah et al.

(10) Patent No.: US 12,739,108 B2
(45) Date of Patent: Sep. 15, 2026

(54) BYPASSING TECHNIQUE TO ENABLE DIRECT ACCESS TO SNAPSHOT DATA IN OBJECT STORE

(71) Applicant: Nutanix, Inc., San Jose, CA (US)

(72) Inventors: Angshuman Bezbaruah, Redmond, WA (US); Brajesh Kumar Shrivastava, Rohtas (IN); Nikhil Loya, Bengaluru (IN); Abhishek Gupta, Vasundhara Ghaziabad (IN); Pradeep Kashyap Ramaswamy, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 272 days.

(21) Appl. No.: 18/237,315

(22) Filed: Aug. 23, 2023

(65) Prior Publication Data

US 2024/0297786 A1 Sep. 5, 2024

(30) Foreign Application Priority Data

Mar. 1, 2023 (IN) ............................ 202341013782

(51) Int. Cl.
*H04L 9/08* (2006.01)
*G06F 16/11* (2019.01)

(52) U.S. Cl.
CPC ............ *H04L 9/088* (2013.01); *G06F 16/128* (2019.01)

(58) Field of Classification Search
CPC ......... H04W 4/40; H04W 4/02; H04W 12/06; H04W 4/029; H04W 4/44; H04W 12/03;
(Continued)

(56) References Cited

U.S. PATENT DOCUMENTS 8,522,028 B2 * 8/2013 Brique .................... G06F 21/72 713/168
8,549,518 B1 * 10/2013 Aron .................. G06F 9/45558 718/1

(Continued)

FOREIGN PATENT DOCUMENTS

EP 4124968 A1 2/2023

OTHER PUBLICATIONS

Cano, Ignacio, "Curator: Self-Managing Storage for Enterprise Clusters" University of Washington; published Mar. 2017; pp. all.

(Continued)

*Primary Examiner* — Sharif E Ullah
(74) *Attorney, Agent, or Firm* — Cesari and McKenna, LLP

(57) ABSTRACT

A bypassing technique bypasses an indexing service and provides a bypass data path for transferring/retrieving snapshots from a production cluster to an object store. In an embodiment, the production cluster may determine how extents of the snapshots are packed into objects of the object store and transfers the snapshots directly to the object store over the bypass data path. Once the snapshot transfer is completed, the production cluster provides location metadata as to how the snapshot extents are packed into objects to the indexing service. The indexing service is invoked to create an index of the location metadata and is not involved in the data transfer of the snapshots. In another embodiment, the production cluster identifies a snapshot to restore and queries the indexing service to compute the deltas between the snapshot to be restored and a reference snapshot. The indexing service returns a set of segments that indicates the changed delta regions between the two snapshots. The production cluster then issues a direct read to the object store
(Continued)

over the bypass data path to read the changed delta segments.

30 Claims, 10 Drawing Sheets

(58) Field of Classification Search
CPC ... H04W 12/041; H04W 12/069; H04W 4/48; H04W 12/033; H04W 4/023; H04W 4/80; H04W 4/90; H04L 63/0428; H04L 67/12; H04L 2209/84; H04L 63/166; H04L 9/3231; H04L 2463/082; H04L 63/0823; H04L 9/3247; H04L 63/0861; H04L 9/3226; H04L 9/0662; H04L 9/0838; H04L 63/029; H04L 9/088; G06F 3/14; G06F 21/316; G06F 21/32; G06F 2221/2103; G06F 16/583; G06F 16/9535; G06F 21/43; G06F 21/6263; G06F 2221/2111; G06F 12/0246
USPC ........ 713/150, 163, 171, 181; 726/2, 21, 36; 380/255, 264, 276
See application file for complete search history.

(56) References Cited

U.S. PATENT DOCUMENTS 8,601,473 B1 * 12/2013 Aron ..................... G06F 9/5072 718/1
8,850,130 B1 * 9/2014 Aron ..................... G06F 3/0685 711/150
8,863,124 B1 * 10/2014 Aron ..................... G06F 9/5061 718/1
9,009,106 B1 * 4/2015 Aron ..................... G06F 3/065 707/610
9,069,708 B2 * 6/2015 Gill ..................... G06F 11/1438
9,336,132 B1 * 5/2016 Aron ..................... G06F 3/067
9,652,265 B1 * 5/2017 Narayanasamy ....... G06F 13/10
9,747,287 B1 * 8/2017 Bhardwaj ............. G06F 3/0604
9,772,866 B1 * 9/2017 Aron ..................... G06F 9/45558
11,080,387 B1 * 8/2021 Lattin ..................... G06F 21/44
11,436,097 B1 * 9/2022 Kumar .................. G06F 3/0668
11,575,745 B2 * 2/2023 Tatiparthi ............ G06F 9/45558
11,829,328 B2 * 11/2023 Gupta ................. G06F 16/1748
11,953,999 B2 4/2024 Kumar
2010/0191967 A1 * 7/2010 Fujii .................. H04L 63/0861 713/169
2011/0231034 A1 * 9/2011 Kinser ..................... B60K 6/46 701/2
2013/0193920 A1 * 8/2013 Dickerhoof ............. B60L 53/00 320/109
2013/0326045 A1 * 12/2013 Wang ................. H04L 41/0226 709/223
2014/0019769 A1 * 1/2014 Pittelko ............... G06F 21/6218 713/189
2015/0350167 A1 * 12/2015 Djakovic ............ H04L 63/0428 713/163
2017/0310674 A1 * 10/2017 Markham ............. H04W 12/04
2019/0007215 A1 * 1/2019 Hakuta ............... H04W 12/069
2021/0119800 A1 * 4/2021 Jung ..................... H04L 9/3226
2021/0209494 A1 * 7/2021 Mukherjee .............. H04L 67/12
2021/0211271 A1 * 7/2021 Kuang .................... H04L 9/065
2021/0250174 A1 * 8/2021 Cheng ................... H04L 9/0825
2021/0281408 A1 * 9/2021 Liu ......................... G06F 7/588
2022/0123923 A1 * 4/2022 Patne .................... H04W 12/04
2022/0309010 A1 * 9/2022 Jiang ................... G06F 13/4004
2022/0398163 A1 * 12/2022 Bezbaruah .......... G06F 11/1451
2023/0029677 A1 * 2/2023 Gupta ................... G06F 16/134
2024/0143462 A1 * 5/2024 Jain ....................... G06F 11/076

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.
Poitras, Steven "The Nutanix Bible" from http://stevenpoitras.com/the-nutanix-bible/ Oct. 15, 2013 (Publication date based on indicated capture date by Archive.org first publication date unknown) pp. all.
Poitras, Steven "The Nutanix Bible—Classic Edition" from https://nutanixbible.com/, dated May 21, 2024, 268 pages.

* cited by examiner 700
710
LEFT KEY (OFFSET_VEC)
RIGHT KEY (OFFSET_VEC)
720
LEFT KEY (OFFSET_VEC)
CURRENT KEY (OFFSET_VEC)
CURRENT KEY (OFFSET_VEC)
RIGHT KEY (OFFSET_VEC)
KEY (DISK_OFFSET)
VALUE (OBJECT_ID OBJECT_OFFSET LENGTH)
730

BYPASSING TECHNIQUE TO ENABLE DIRECT ACCESS TO SNAPSHOT DATA IN OBJECT STORE

CROSS-REFERENCE TO RELATED APPLICATION

The present application claims the benefit of India Provisional Patent Application Ser. No. 202341013782, which was filed on Mar. 1, 2023, by Angshuman Bezbaruah, et al. for BYPASSING TECHNIQUE TO ENABLE DIRECT ACCESS TO SNAPSHOT DATA IN OBJECT STORE, which is hereby incorporated by reference.

BACKGROUND

Technical Field

The present disclosure relates to archival of data and, more specifically, to efficient replication and retrieval of snapshot data in an archival storage system such as an object store.

Background Information

Data failover generally involves copying or replicating data among multiple storage systems or datacenters to enable continued operation of data processing operations in a multi-site data replication environment, such as backup, archival storage, and disaster recovery. The multi-site data replication environment may be configured to transfer (replicate), store, and retrieve data embodied as large numbers of snapshots archived over long periods of time, which may be archived in long-term storage typically at cloud-based storage providers. Storage and retrieval from the archive may be facilitated by an intermediary site providing an index scheme that requires, e.g., sending a request (message) to access specific data to the intermediary site which, in turn, accesses the actual archived data. This arrangement increases latency and decreases throughput, and risks creating a bottleneck as data must flow through the intermediary site. In addition, needless data transformations such as, e.g., compression/decompression, between the archive and the intermediary site may be performed. As such, a technique for direct access at the archive using an index scheme at an intermediary site is needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a bypassing technique configured to bypass an intermediary service (e.g., an indexing service) in a data path from a client (e.g., a production cluster) to an archival storage system (e.g., an object store) for storing/retrieving data (e.g., snapshots). In an embodiment, the production cluster may determine how extents of the snapshots are packed into objects of the object store and transfers/retrieves the snapshots directly to/from the object store over the bypass data path according to the indexing service managing the objects into which the extents are stored. Illustratively, the indexing service provides object identifiers (IDs) and other access information (e.g., access keys) to the production cluster for direct access to the objects of the object store. Once the snapshot transfer is completed, the production cluster provides location metadata as to how the snapshot extents are packed into objects to the indexing service to create an index of the location metadata. To retrieve data, the indexing service is invoked to provide access to the objects in the object store and, using the index, obtain the location metadata for the data being retrieved. Notably, the indexing service is not part of the data path involved in the data transfer or retrieval of the snapshots.

In another embodiment, the production cluster may identify a snapshot to restore (as well as a reference snapshot) and query the indexing service that computes the changes (deltas) between the snapshot to be restored and the reference snapshot. The indexing service may return a set of segments that indicates the changed delta regions between the two snapshots within an address space of one or more objects in the object store having the changes between the two snapshots, i.e., a set of address ranges within the one or more objects. The production cluster may then issue a direct read to the object store over the bypass data path to read the changed delta segments using the set of address ranges and corresponding object IDs for the one or more objects.

Advantageously, the bypassing technique allows a client to transmit its data only once, e.g., to the object store and avoid multiple data access "hops," e.g., via the indexing service. By eliminating multiple hops and transferring/retrieving data directly from the object store, the bypassing technique reduces the transfer of large amounts of data to the indexing service, while increasing performance (e.g., reducing latency and increasing throughput as well as scalability) for write/read accesses.

DESCRIPTION

Figure 1:
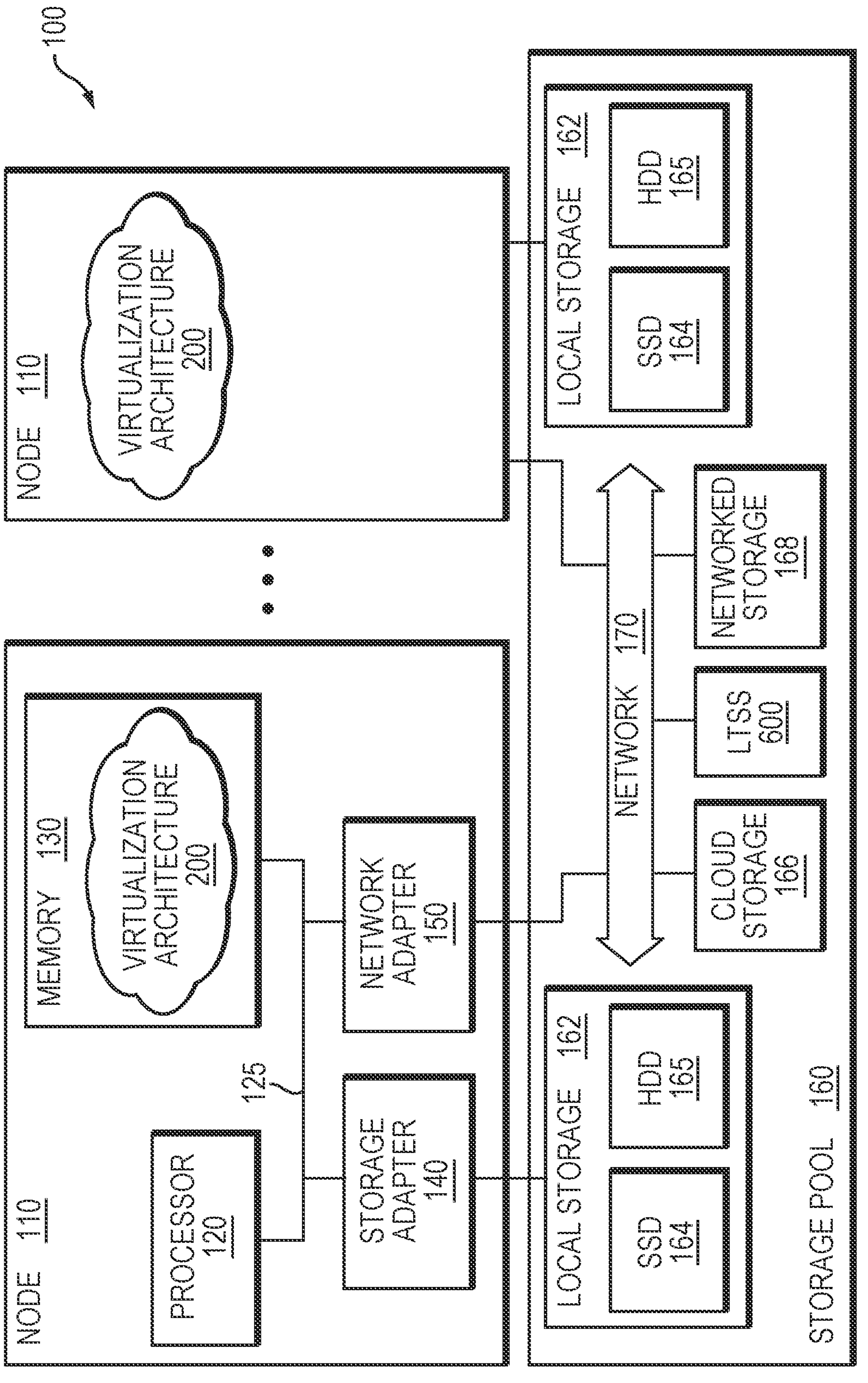
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. As described herein, a long-term storage service (LTSS 600) of an archival storage system provides storage of large numbers (amounts) of point-in-time images or recovery points (i.e., snapshots) of application workloads on an object store. Communication over the network 170 may be affected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
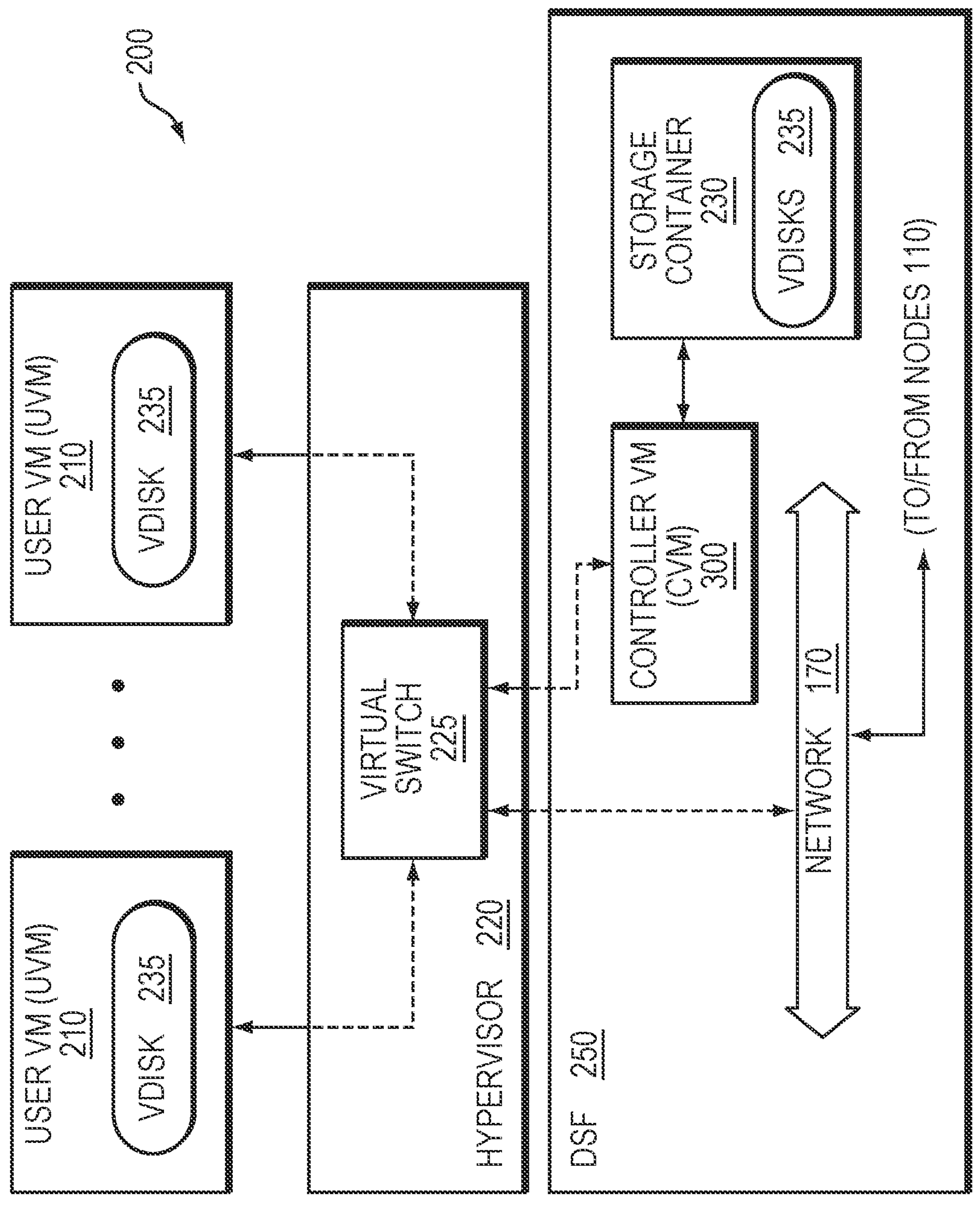
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster wide.

The client software (e.g., one or more user applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized. e.g., by software running on the CVMs. and exported as virtual disks (vdisks) 235 to the UVMs 210. In some embodiments, the vdisk is exposed via ISCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIES or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
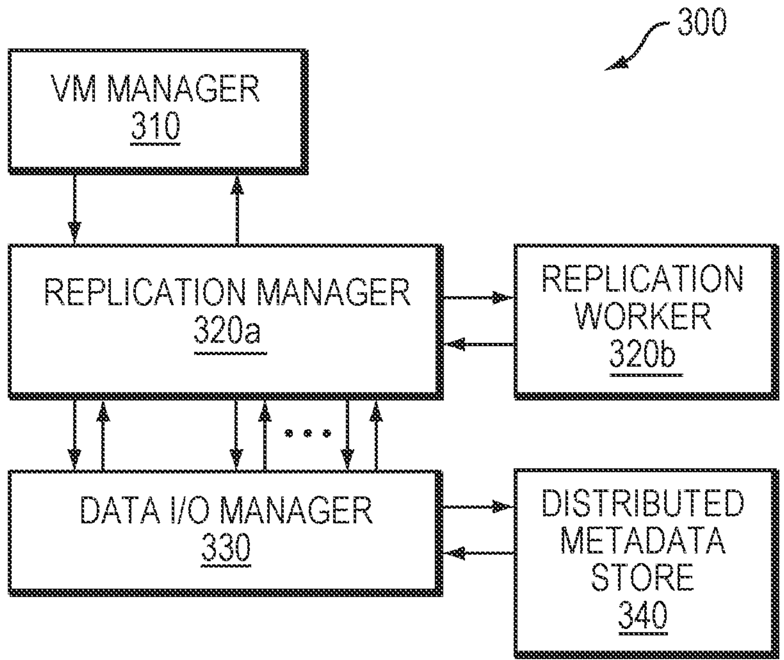
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack running in a user space of the operating system of the CVM to provide storage and I/O management services within DSF 250. The processes include a virtual machine (VM) manager 310 configured to manage creation, deletion, addition, and removal of virtual machines (such as UVMs 210) on a node 110 of the cluster 100. For example, if a UVM fails or crashes, the VM manager 310 may spawn another UVM 210 on the node. A replication manager 320*a* is configured to provide replication and disaster recovery capabilities of DSF 250. Such capabilities include migration/failover of virtual machines and containers as well as scheduling of snapshots. In an embodiment, the replication manager 320*a* may interact with one or more replication workers 320*b*. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. In an embodiment, the data I/O manager 330 and replication manager 320 cooperate with DSF 250 to schedule and generate, i.e., provide support for, snapshots, which are point-in-time copies of storage objects, such as files, LUNs and/or vdisks. A distributed metadata store 340 stores and manages all metadata in the node/cluster, including metadata structures that store metadata used to locate (map) the actual content of vdisks on the storage devices of the cluster.

Data replication generally involves copying or replicating data among one or more nodes 110 of clusters 100 embodied as, e.g., datacenters to enable continued operation of data processing operations in a multi-site data replication environment, such as backup, archival storage and/or disaster recovery. The multi-site data replication environment includes two or more datacenters, i.e., sites, which may be geographically separated and connected over a communication network, such as a WAN. For example, data at a local datacenter (primary site) may be replicated over the network to a remote datacenter (secondary site) located at a geographically separated distance to ensure access to the data and continuity of data processing operations in the event of, e.g., a failure of the nodes at the primary site.

Synchronous replication may be used to replicate the data between the sites such that each update to the data at the primary site is copied to the secondary site. For instance, every update (e.g., write operation) issued by a UVM 210 to data designated for backup (i.e., backup data) is continuously replicated from the primary site to the secondary site before the write operation is acknowledged to the UVM. Thus, if the primary site fails, the secondary site has an exact (i.e., mirror copy) of the backup data at all times. Synchronous replication generally does not require the use of snapshots of the data; however, to establish a multi-site data replication environment or to facilitate recovery from, e.g., network outages in such an environment, a snapshot may be employed to establish a point-in-time reference from which the sites can (re)synchronize the backup data.

In the absence of continuous synchronous replication between the sites, the current state of the backup data at the secondary site always "lags behind" (is not synchronized with) that of the primary site resulting in possible data loss in the event of a failure of the primary site. If a specified amount of time lag in synchronization is tolerable, then asynchronous (incremental) replication may be selected between the sites, for example, a point-in-time image replication from the primary site to the secondary site. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site data backup and/or protection environment, a base snapshot is required at each site. Note that the data may include an entire state of a virtual machine including associated storage objects.

Figure 4:
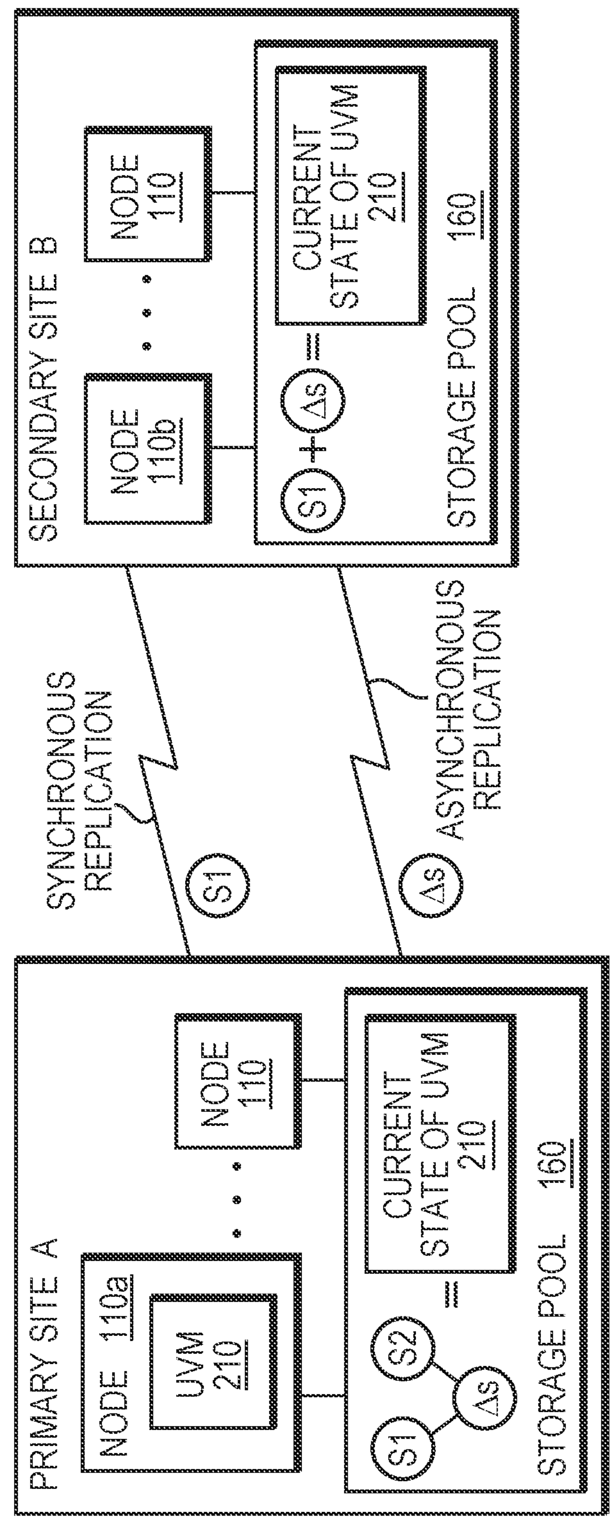
FIG. 4 is a block diagram of an exemplary multi-site data replication environment configured for use in various deployments, such as for backup, archival storage, and/or disaster recovery.

FIG. 4 is a block diagram of an exemplary multi-site data replication environment configured for use in various deployments, such as for backup and/or archival storage. Illustratively, the multi-site environment 400 includes two sites: primary site A and secondary site B, wherein each site represents a datacenter embodied as a cluster 100 having one or more nodes 110. A category of data (e.g., one or more UVMs 210) running on primary node 110*a* at primary site A is designated for backup to secondary site B (e.g., secondary node 110*b*). A first snapshot S1 of the data is generated at the primary site A and replicated (e.g., via synchronous replication) to secondary site B as a base or "common" snapshot S1. A period of time later, a second snapshot S2 may be generated at primary site A to reflect a current state of the data (e.g., UVM 210). Since the common snapshot S1 exists at sites A and B as a reference, only incremental changes (deltas Δs) to the data designated for backup need be sent (e.g., via asynchronous replication) to site B, which applies the deltas (Δs) to S1 so as to synchronize the state of the UVM 210 to the time of the snapshot S2 at the primary site. A tolerance of how long before data loss will exceed what is acceptable may determine (i.e., impose) a frequency of snapshots and replication of deltas to the backup site, e.g., a data loss tolerance of 60 mins requires snapshots with commensurate delta replication every 60 mins-deemed a Recovery Point Objective (RPO) of 60 minutes.

Figure 5:
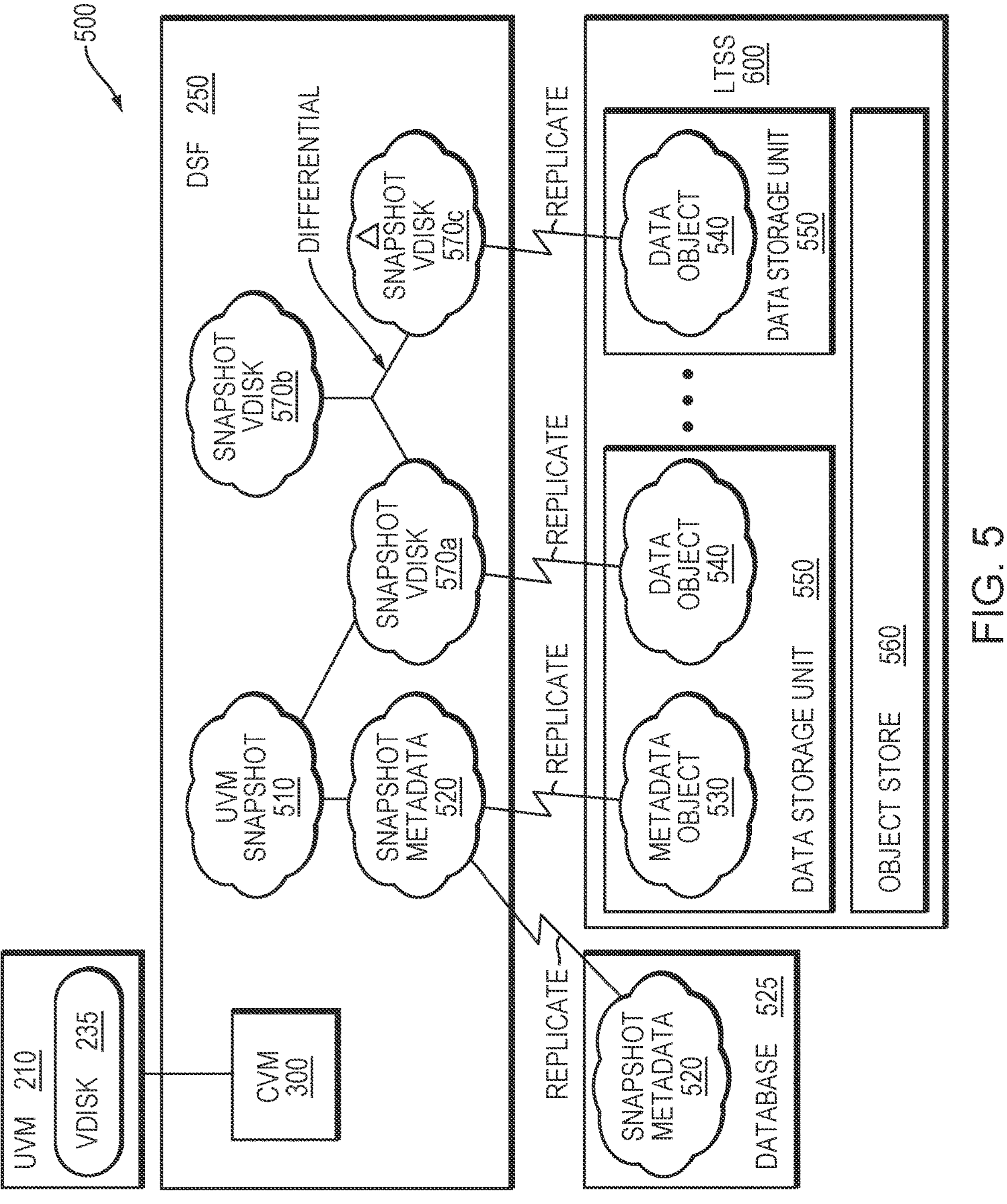
FIG. 5 is a block diagram of an exemplary data replication environment configured to replicate snapshots for storage to a long-term storage service (LTSS) of an archival storage system.

The embodiments described herein are related to an indexing technique configured to provide an index data structure for efficient retrieval of data of a snapshot from the LTSS of the archival storage system. FIG. 5 is a block diagram of an exemplary data replication environment 500 configured to replicate snapshots for storage to the LTSS of the archival storage system. The architecture of LTSS 600 is configured to process large amounts of point-in-time images or recovery points (i.e., snapshots) of application workloads for storage on an object store 560 (archival storage vendor such as Amazon AWS S3 storage services, Google Cloud Storage, Microsoft Azure Cloud Storage and the like), wherein the workloads are characterized by a logical entity having typed data, e.g., a virtual machine (VM) such as a UVM 210. A client of LTSS 600 may be a distributed file system of a storage system (e.g., CVM 300 of DSF 250) that generates snapshots of the UVM (e.g., data processed by a user application running in the UVM) and replicates the UVM snapshot 510 for storage in the object store 560. Replication, in this context, is directed to storage devices that exhibit incremental, block-level changes. LTSS 600 is thus a "generic" long-term storage service of an archival/backup storage system from the perspective of the client, i.e., the client flushes (delivers) data blocks of UVM snapshots 510 to the LTSS 600, which organizes the blocks for long-term storage within objects of the object store 560. Each UVM snapshot 510 is generally handled as a data storage unit 550 by LTSS 600.

Illustratively, the content of each UVM snapshot 510 includes snapshot metadata and snapshot data, wherein the snapshot metadata 520 is essentially configuration information describing the logical entity (e.g., UVM 210) in terms of, e.g., virtual processor, memory, network, and storage device resources of the UVM. The snapshot metadata 520 of the UVM 210 is illustratively replicated for storage in a query-able database 525 although, in an embodiment, the snapshot metadata 520 may be further replicated and organized as a metadata object 530 within a configuration namespace (e.g., bucket) of the object store 560 of LTSS 600 for long-term durability and availability. The data of the UVM 210 is virtualized as a disk (e.g., vdisk 235) and, upon generation of a snapshot, is processed as snapshot vdisk 570 of the UVM 210. The snapshot vdisk 570 is replicated, organized, and arranged as one or more data objects 540 of the data storage unit 550 for storage in the object store 560. The data is stored on a storage device of the object store as extents (i.e., contiguous data slices). Each extent of the snapshot vdisk 570 is a contiguous range of address space within a data object 540, wherein the extents are "packed" into the data object 540 and accessible by, e.g., offsets and lengths. Note that a preferred size (e.g., 16 MB) of each data object 540 may be specified by the object store/vendor (e.g., AWS S3 cloud storage) for optimal use of the object store/vendor.

Operationally, the client initially generates a full snapshot of vdisk 235 (e.g., snapshot vdisk 570*a*) and transmits copies (i.e., replicas) of its data blocks to effectively replicate the snapshot vdisk 570*a* to LTSS 600. The snapshot vdisk 570*a* is thereafter used as a reference snapshot for comparison with one or more subsequent snapshots of the vdisk 235 (e.g., snapshot vdisk 570*b*) when computing incremental differences (deltas Δs). To support a RPO, the client (e.g., CVM 300) generates the subsequent vdisk snapshots 570*b* at predetermined (periodic) time intervals and computes the deltas of these periodically generated snapshots with respect to the reference snapshot. The CVM 300 transmits replicas of data blocks of these deltas as Δ snapshot vdisk 570*c* to LTSS. Note that from the perspective of the CVM 300, the LTSS 600 is a storage entity having an address on the network 170 (or WAN), similar to any networked storage 168. However, unlike networked storage 168, which is generally exposed to (accessed by) the CVM 300 using filesystem protocols such as NFS. CIFS and iSCSI, the LTSS 600 is accessed using specialized application program interfaces (APIs) referred to herein as replication APIs, which have rich descriptive semantics for managing, storing, and retrieving the snapshots retained in the LTSS. For example, a replication API may specify the snapshotted vdisk 570*a* of the logical entity (e.g., UVM 210) as well as information describing the snapshot metadata 520 and snapshot vdisk 570*a* of the entity for locating and storing or retrieving data from the LTSS. The CVM 300 then transmits (replicates) a stream of data blocks of the snapshotted vdisk 570*a* to LTSS 600.

Figure 6:
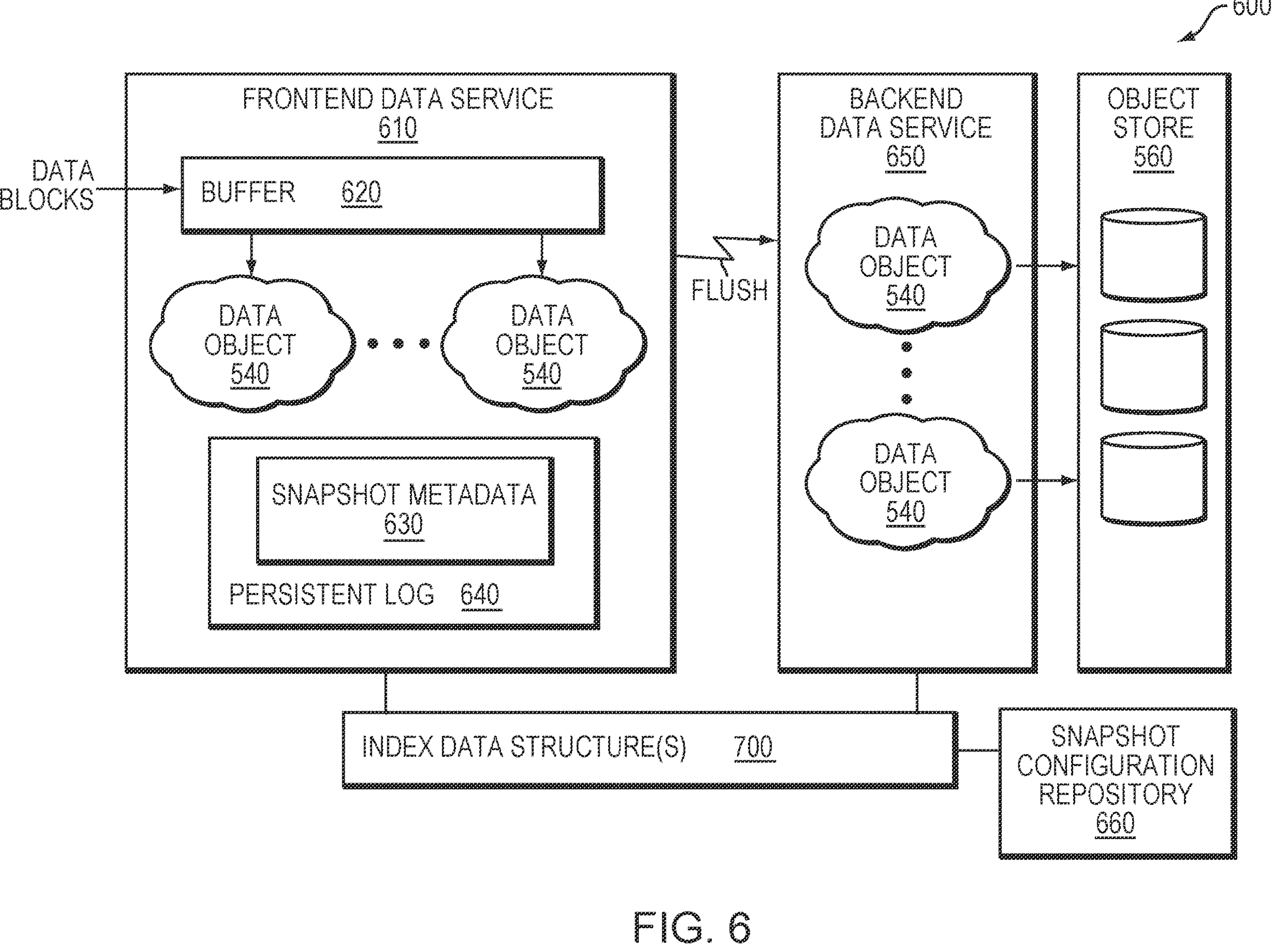
FIG. 6 is a block diagram of the LTSS of the archival storage system.

FIG. 6 is a block diagram of the LTSS 600 of the archival storage system. Illustratively, the LTSS 600 includes two data services (processes): a frontend data service 610 that cooperates with the client (e.g., CVM 300) to organize large amounts of the replicated snapshot data (data blocks) into data objects 540 and a backend data service 650 that provides an interface for storing the data objects 540 in the object store 560. In an embodiment, the LTSS data services/processes may execute on a computing platform at any location (e.g., may be geographically separate from a location of the object store) and is generally "stateless" as all data/metadata are stored on the object store 560. That is, the LTSS is a serverless transactional indexing service that may execute anywhere that has a network connection to the object store and the CVM. Accordingly, the frontend data service 610 and backend data service 650 may run either locally on a node of an "on-prem" cluster or remotely on a node of an "in-cloud" cluster. In response to receiving an initial replication API directed to the snapshot vdisk 570*a*, the frontend data service 610 temporarily stores the stream of data blocks of the snapshot vdisk 570*a*, e.g., in a buffer 620 and writes the data blocks into one or more extents (i.e., contiguous, non-overlapping, variable-length regions of the vdisk) for storage in data objects 540 of a preferred size (e.g., 16 MB) as specified by the object store vendor for optimal use. The frontend data service 610 then forwards (flushes) the data objects 540 to the backend data service 650 for storage in the object store 560 (e.g., AWS S3). In response to receiving a subsequent replication API directed to the Δ snapshot vdisk 570*c*, the frontend data service temporarily stores the stream of data blocks of the Δ snapshot vdisk 570*c* in buffer 620, writes those data blocks to one or more data objects 540, and flushes the objects to the backend data service 650.

Prior to flushing the data objects 540 to the backend data service 650, the frontend data service 610 creates metadata that keeps track of the amount of data blocks received from the CVM 300 for each replicated snapshot, e.g., snapshot vdisk 570*a* as well as Δ snapshot vdisk 570*c*. The metadata associated with the snapshot (i.e., snapshot metadata 630) is recorded as an entry in persistent storage media (e.g., a persistent log 640) local to the frontend data service 610. The snapshot metadata 630 includes information describing the snapshot data, e.g., a logical offset range of the snapshot vdisk 570. In an embodiment, the snapshot metadata 630 is stored as an entry of the persistent log 640 in a format such as, e.g., snapshot identifier (ID), logical offset range of snapshot data, logical offset into the data object to support storing multiple extents into a data object, and data object ID. The frontend data service 610 updates the snapshot metadata 630 of the log entry for each data object 540 flushed to the backend data service 650 and maintains offset of the data object where extents of the snapshot are stored. Notably, the snapshot metadata 630 is used to construct the index data structure 700 of LTSS.

Illustratively, the index data structure 700 is configured to enable efficient identification (location) and retrieval of data blocks of the snapshots contained within numerous data objects 540 stored on the object store 560. Effectively, the index data structure acts as an independent database organized to retrieve data by extent of a vdisk (as recorded in the associated object store of the archival storage system) according to any snapshot. In essence, the index metadata structure is a searchable mapping of snapshot extents to objects (and offsets within those objects) of the object store. Notably, each snapshot is associated with a corresponding index data structure and may include incremental changes to a prior snapshot that may reference a prior index data structure associated with the prior snapshot. In this manner, only the incremental changes between snapshots need to be stored in the archival storage system as indicated above, because later index data structures may reference (via prior index data structures) older blocks in prior snapshots.

Accordingly, the index data structure 700 may be extended to embody a plurality of "cloned," e.g., copy-on-write, index structures associated with many of the data objects 540 of LTSS 600 to enable the location and retrieval of the data blocks. To that end, a snapshot configuration repository 660 (e.g., database) is provided, e.g., on storage media local to the LTSS data services, to locate a snapshot index data structure that is dynamically query-able by the data services to select a snapshot (i.e., the repository is organized according to snapshot) and its corresponding index data structure 700 of a data object, e.g., from among the numerous (cloned) index data structures. Further, the repository 660 may also be stored on the object store 560 to ensure fault tolerance, durability, and availability.

In an embodiment, the snapshot configuration repository 660 is organized as a key-value store that provides a higher-level of indexing (i.e., higher than the actual index data structure) to resolve to a snapshot corresponding to a (cloned) index data structure used to retrieve one or more data blocks for data objects stored in the object store 560. The snapshot configuration repository 660 is managed separately from the object store (e.g., remote from the object store media) and points to roots of the (cloned) index structures associated with snapshot data objects (e.g., using a remote referencing mechanism such as a URL to a root node of a cloned index structure resident on object store media located on the network/internet.) Such remote referencing enables essentially infinite storage capacity of the LTSS object store, e.g., among various cloud service providers (CSPs) such as AWS, Google, Azure and the like, that is not limited by an address space (file space, namespace) of a (client) distributed file system. Note that the limited address space of such client file systems also limits the amount of "active" file system snapshots that can be maintained on the client's storage (such as a volume).

In an embodiment, the snapshot configuration repository 660 may be used as a search engine to enable efficient locating and retrieving of a data block from the selected object. Similar to the persistent log 640, the snapshot configuration repository 660 includes configuration information about each snapshot and associated data object as well as pointers to the roots of the index data structures for the data objects. The repository 660 may also be indexed by timestamp or VM/vdisk name of a snapshot. The snapshot may then be selected and a pointer to a root node of the corresponding index data structure 700 may be identified to access a specified logical offset range of a snapshot. Notably, the index data structure 700 is configured to translate (map) the logical offset range (address space) of data in the snapshot to the data object address space of the object store hosting the snapshot data to thereby enable efficient (i.e., bounded time) retrieval of the snapshot data from the object store independent of the number of snapshots.

Figure 7:
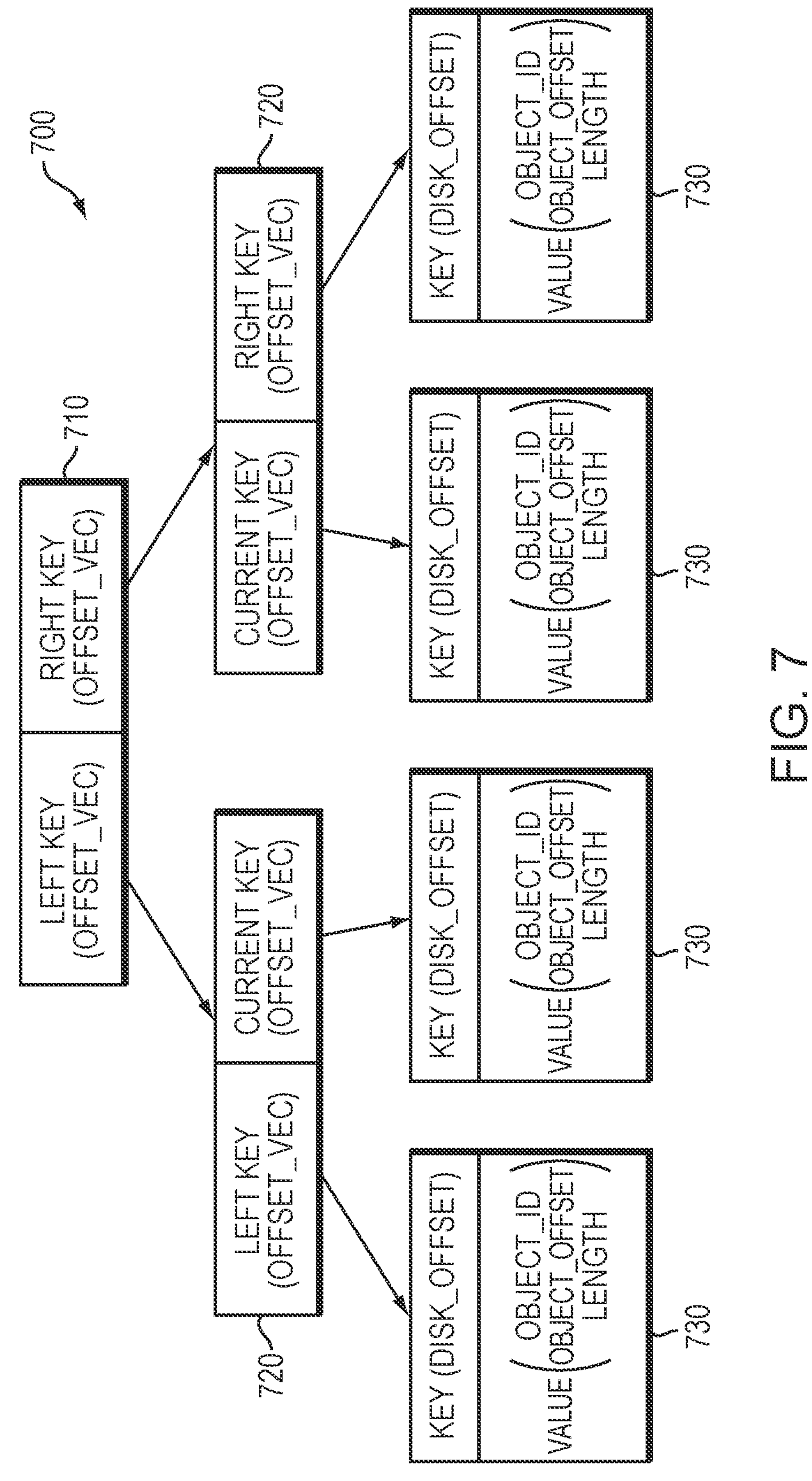
FIG. 7 is a block diagram illustrating an index data structure configured for efficient retrieval of snapshots from the LTSS of the archival storage system.

FIG. 7 is a block diagram illustrating the index data structure 700 configured for efficient retrieval of snapshots from the LTSS of the archival storage system. In one or more embodiments, the index data structure 700 is illustratively a balanced tree (e.g., a B+ tree) with a large branching factor for internal nodes to maintain a limited depth of the tree, although other types of data structures, such as bitmaps, heaps, and hashes, may be used with the embodiments described herein. When embodied as the B+ tree, the index data structure includes a root node 710, one or more intermediate (internal) nodes 720 and a plurality of leaf nodes 730. For the reference snapshot vdisk 570*a*, each internal node 720 contains a set of keys that specify logical offset ranges into the address space of the vdisk 570*a* and corresponding values that reference other nodes in the B+ tree (e.g., lower-level internal nodes or leaf nodes). Each leaf node 730 contains a value describing (pointing to) a data object having the extent that includes the selected data blocks corresponding to the specified logical offset range as well as a logical offset of the extent in the data object and length of the extent. In other words, a leaf node can be considered as a 4-tuple having: (i) a logical offset in the address space of the logical entity (e.g., snapshot), (ii) a data object id, (iii) a logical offset of the extent into the data object, and (iv) a length of the extent. The technique only requires traversing the depth of a (cloned) index data structure to find the leaf node 730 pointing to a selected data block of a particular snapshot within the address space of a data object in the object store. Notably, a large branching factor (e.g., 1024) for internal nodes permits a very large number of references in the internal nodes 720 of the B+ tree so that a depth of the tree is reduced (e.g., to 2 or 3 levels) enabling an effective bounded traversal time from the root node to a leaf node (e.g., traverse at most 3 nodes to locate data in the object store). The address space covered by the leaf nodes is of variable length and depends upon a number of extents referenced according to the branching factor. In an embodiment, the internal nodes have a branching factor much larger than the leaf nodes to support a very large address space (e.g., given an extent size of less than 1 MB and a branching factor of 32K, a two-level B-tree can reference an address space as great as 16 exabytes).

In an embodiment, each internal node 720 contains keys and pointers to children nodes, and generally not any values. The root node 710 is a variant of the internal node 720 but similar to the internal node, contains disk offsets as keys. For each key, a left pointer points to data of the vdisk ranging from a left key to (and including) a current key; illustratively, data in a "child" internal node 720 for the left pointer embodies the form [left key, current key]. A right pointer points to data of the vdisk ranging from the current key to (but excluding) a right key; illustratively, data in a child internal node for the right pointer embodies the form [current key, right key]. The fields of the internal node illustratively include (i) Offset_Vec containing a list of offsets in the vdisk that function as a key; and (ii) Child_Pointer_Vec containing a pointer to a child node.

The leaf node 730 contains a predetermined number of segment descriptors (e.g., up to 1024), each of which describes the vdisk address space covered by the descriptor and the location of the corresponding data in the form of the following keys and values:

Key(Disk_Offset)→Value(Object_ID,Object_Logical_Offset,Length)

wherein Disk_Offset refers to the offset within the vdisk; Object_ID identifies the data object in the archival storage system and may be a combination of a vdisk uuid (universally unique identifier) and an assigned predefined (e.g., 64-bit integer) number; Object_Logical_Offset is the logical offset with the object (specified by Object_ID) at which the data resides; and Length is the number of contiguous bytes (size of the extent) beginning at "Offset" (Disk_Offset) that is pointed to by the key entry.

Referring to FIGS. 5 and 6, assume the CVM 300 generates the reference snapshot as snapshot vdisk 570*a* for vdisk 235 and having a size of 1 TB with an assigned vdisk ID of, e.g., 1. The CVM 300 replicates the data blocks of the snapshot vdisk 570*a* to the LTSS 600 in accordance with a first replication API call that identifies the vdisk ID 1 and the snapshot vdisk 570*a* as, e.g., snapshot ID 1. In response to receiving the first replication API call, the frontend data service 610 "buffers" the changed data blocks to a preferred size (e.g., 16 MB) of the object store and writes the blocks into a plurality of ("n") data objects 540 assigned, e.g., data object IDs 1-n. The frontend data service 610 also records snapshot metadata 630 describing the written data blocks (e.g., vdisk ID 1, snapshot ID 1, logical offset range 0-1 TB, data object IDs 1a-n) to the persistent log 640. After all of the data blocks are replicated and flushed to the object store 560, the frontend data service 610 constructs one or more index data structures 700 for the snapshot vdisk 570*a* (i.e., a parent B+ tree) using the appropriate snapshot metadata 530 for snapshot ID 1.

Assume that at the predetermined time interval, the CVM 300 generates a subsequent snapshot for the vdisk 235 (e.g., snapshot vdisk 570*b*) and after specifying snapshot 570*a* as a reference snapshot and performing the incremental computation, determines that the deltas (changes) of data blocks between the snapshot vdisks 570*a,b* lie in the offset range of 1 MB-5 MB and 1 GB-2 GB of the reference snapshot (e.g., snapshot vdisk 470*a*). Such deltas may be determined for a series of snapshots. For example, the CVM 300 may issue a second replication API call to the LTSS 600 that identifies the vdisk ID 1, a first snapshot vdisk 570*b* as, e.g., snapshot ID 2, and the logical offset range of 1 MB-5 MB for the changed data blocks. The CVM 300 then replicates the delta data blocks to the LTSS 600. In response to receiving the first replication API call, the frontend data service 610 buffers the changed data blocks to a preferred size (e.g., 16 MB) and writes the blocks into a data object 540 assigned, e.g., an object ID 2. The frontend data service 610 also records snapshot metadata 630 describing the written data blocks (e.g., vdisk ID 1, snapshot ID 2, logical offset range 1 MB-5 MB, object ID 2) to the persistent log 640.

After all of the changed data blocks are replicated and flushed to the object store 560, the frontend data service 610 constructs an index data structure 700 for the first snapshot vdisk 570*b* using the appropriate snapshot metadata 630 for snapshot ID 2. Assume the changed data blocks at the logical offset range 1 MB-5 MB of the snapshot vdisk 570*a* fit within the data object (extent) referenced by a leaf node 730 of the parent B+ tree. A new, updated copy of the leaf node may be created to reflect the changed data blocks at the logical offset range while the remaining leaf nodes of the parent B+ tree remain undisturbed. Updated copies of the internal node(s) 720 referencing the logical offset range of the changed data blocks described by the updated leaf node may likewise be created. A new "cloned" B+ tree is thus constructed based on the parent B+ tree using a copy-on-write technique. The cloned B+ tree has a new root node 710*a* and internal nodes 720 that point partially to "old" leaf nodes 730 of the parent B+ tree as well as to the new leaf node 730*a* (not shown). Illustratively, the leaf node 730*a* is copied and then modified to reference the changed data. Effectively, the cloned B+ tree for the first Δ snapshot vdisk 570*c* is a "first child" B+ tree that shares internal and leaf nodes with the parent B+ tree.

The CVM 300 thereafter issues a third replication API call to the LTSS 600 that identifies the vdisk ID 1, a second Δ snapshot vdisk 570*c* as, e.g., snapshot ID 3, and the logical offset range of 1 GB-2 GB for the changed data blocks. The CVM 300 replicates the delta data blocks to the LTSS 600. In response to receiving the third replication API call, the frontend data service 610 buffers the changed data blocks to a preferred size (e.g., 16 MB) and writes the blocks into "n" data objects 540 assigned, e.g., object IDs 3a-n (not shown). The frontend data service 610 records snapshot metadata 630 describing the written data blocks (e.g., vdisk ID 1, snapshot ID 3, logical offset range 1 GB-2 GB, object IDs 3a-n) to the persistent log 640. After all of the changed data blocks are replicated and flushed to the object store 560, the frontend data service 610 constructs one or more second child B+ trees for the second Δ snapshot vdisk, as described above. Notably, a large branch factor of the B+ tree permits a very large number of references in the internal nodes of the B+ tree to support a correspondingly large number of changes between snapshots so that the index structure depth of the tree may be maintained at a maximum depth (e.g., 2 to 3 levels) enabling rapid traversal time from the root node to a leaf node. That is, no matter how many snapshots exist, references to the oldest data remain referenced by the newest snapshot resulting in a fixed number of node traversals to locate any data.

Operationally, retrieval of data blocks (snapshot data) by the LTSS indexing service from any snapshot stored in the archival storage system involves fetching the root of the index (B+ tree) data structure 700 associated with the snapshot from the snapshot configuration repository 660, using the offset/range of the snapshot data block(s) to be retrieved as a key to traverse the tree to the appropriate leaf node 730, which points to the location of the data blocks in the data object 540 of the object store 560. For incremental restoration of snapshot data, the technique further enables efficient computation of differences (deltas) between any two snapshots using the index metadata rather than information within the snapshot itself. In this manner, a delta between any two snapshots no matter how far apart (i.e., independent of a number of intervening snapshots) may be computed without accessing metadata of the intervening snapshots. In an embodiment, the LTSS indexing service performs the delta computations by accessing the snapshot configuration repository 660, identifying the root nodes 710 of the corresponding index data structures 700 (e.g., B+ trees) for the two snapshots, and traversing their internal nodes 720 all the way to the leaf nodes 730 of the index data structures to determine any commonality/overlap of values. All leaf nodes 730 that are common to the B+ trees are thus eliminated, leaving the non-intersecting leaf nodes corresponding to the snapshots. The leaf nodes of each tree are traversed to obtain a set of <logical offset, object ID, object offset>tuples and these tuples are compared to identify the different (delta) logical offset ranges between the two snapshots. These deltas then may be accessed from the data objects and provided to a requesting client.

The embodiments described herein are directed to a bypassing technique configured to bypass an intermediary server (e.g., an indexing service) in a data path from a client (e.g., a production cluster) to an archival storage system (e.g., an object store) for storing/retrieving data (e.g., snapshots). In an embodiment, the production cluster may determine how extents of the snapshots are packed into objects of the object store and transfers/retrieves the snapshots directly to/from the object store over the bypass data path according to the indexing service managing the objects into which the extents are stored. Illustratively, the indexing service provides object identifiers (IDs) and other access information (e.g., access keys) to the production cluster for direct access to the objects of the object store. Once the snapshot transfer is completed, the production cluster provides location metadata as to how the snapshot extents are packed into objects to the indexing service to create an index of the location metadata. To retrieve data, the indexing service is invoked to provide access to the objects in the object store and, using the index, obtain the location metadata for the data being retrieved. Notably, the indexing service is not part of the data path involved in the data transfer or retrieval of the snapshots.

In another embodiment, the production cluster may identify a snapshot to restore (as well as a reference snapshot) and query the indexing service that computes the changes (deltas) between the snapshot to be restored and the reference snapshot. The indexing service may return a set of segments that indicates the changed delta regions between the two snapshots within an address space of one or more objects in the object store having the changes between the two snapshots, i.e., a set of address ranges within the one or more objects. The production cluster may then issue a direct read to the object store over the bypass data path to read the changed delta segments using the set of address ranges and corresponding object IDs for the one or more objects.

In an embodiment, the bypassing technique may be deployed in a disaster recover (DR) as a service (DRaaS) offering where the indexing service (e.g., LTSS) runs in a CSP such as, e.g., AWS, Google, or Azure. Data processing operations represent a substantial amount of the CSP processor and memory resources consumed by LTSS; reducing the consumption of those resources enables a corresponding significant reduction in cost of the DRaaS offering.

Figure 8:
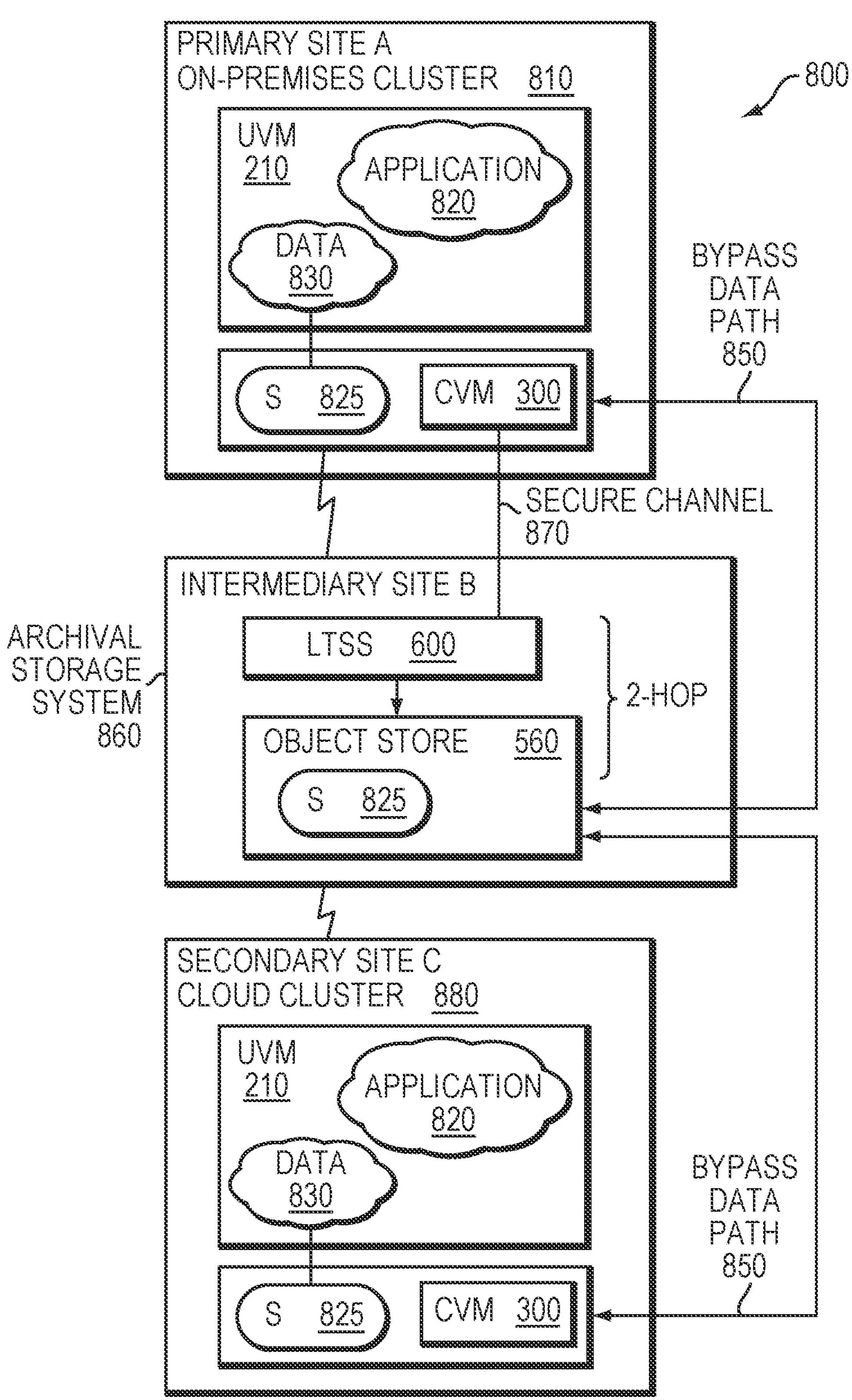
FIG. 8 is a block diagram of an exemplary multi-site data replication environment illustrating a bypassing technique for use in various deployments such as for backup, archival storage, and/or DR as a Service offerings.

FIG. 8 is a block diagram of an exemplary multi-site data replication environment illustrating the bypassing technique for use in various deployments such as for backup, archival storage, and/or DRaaS offerings. Illustratively, the multi-site environment 800 includes three sites: a primary site A (e.g., "source" datacenter embodied as a primary production cluster having one or more nodes), a secondary site C (e.g., "target" datacenter embodied as a secondary production cluster having one or more nodes) and an intermediary site B (e.g., an "intermediary" archival storage system) configured to provide a service (e.g., an indexing service) running on a separate platform or co-located with the target.

Data to be replicated on the source may be generated by taking a snapshot of application data of an object, such as a UVM 210 or vdisk 235, and replicating the data to the intermediary at site B. For example, a customer application 820 running in a UVM 210 on primary production cluster (e.g., on-premises cluster 810) of site A actively generates and replicates snapshots S 825 of its application data 830 to intermediary site B (e.g., LTSS 600 running in a public CSP) for backup storage on the archival storage system 860 (e.g., an object store 560). Snapshots S 825 generated at the on-premises cluster 810 may be replicated by processes of CVM 300 (e.g., replication manager 320 and data I/O manager 330) executing on one or more nodes 110 of the on-premises cluster 810 and stored at the intermediary site B to provide lower cost storage than the on-premises cluster. As described above, LTSS 600 provides an indexing service for location metadata used to locate the snapshots S 825 stored on the object store 560.

Assume a disaster event occurs in a DRaaS deployment of the on-premises cluster 810 resulting in failure of, e.g., one or more nodes 100 running the UVM 210 and application 820. During failover of the UVM 210 running on the on-premises cluster 810, secondary production cluster (e.g., cloud cluster 880) at secondary site C is instantiated which, in turn, spins up (initializes) and recovers the UVM 210, as well as its application 820 and data 830, from one or more snapshots S 825 stored and retrieved from object store 560 using LTSS 600. Illustratively, the CVM processes (e.g., replication manager 320 and data I/O manager 330) executing on one or more nodes 110 of the cloud cluster 880 may invoke restore operations to hydrate snapshot data (e.g., S 825) from LTSS 600 (and object store 560) to the cloud cluster 880. The recovered UVM 210 then resumes execution of the application 820 on the cloud cluster 880.

In an embodiment, the replication manager 320 identifies a snapshot S 825 to replicate and restore, as well as a reference snapshot used for computing differences during a restore/retrieval procedure. It would be advantageous to not have to wait for the snapshot to be restored entirely before application execution can be resumed at the cloud cluster 880. Rather, it would be desirable to demand page data of the snapshot S 825 from the object store 560. Yet, latency of data access is crucial when demand paging data needed to run an application, e.g., application 820. Notably, the latency of accessing data directly from a single hop (e.g., object store 560) is substantially less than traversing two hops (e.g., LTSS 600 and object store 560). The bypassing technique thus provides a clear benefit by eliminating an intermediate hop (e.g., LTSS) during data access operations over bypass data path 850 to the object store 560.

In an embodiment, the replication manager 320 has a capability of data access, e.g., object store drivers, to directly access the object store 560. The replication manager 320 issues an initial request to LTSS 600 (the indexing service) for access credentials (e.g., access keys and secret keys) to the object store 560 as well as transformation information (e.g., compression and/or encryption algorithms) for the snapshot data. The replication manager 320 may then cooperate with the data I/O manager 330 to access the (write/retrieve) the data directly from the object store 560 over bypass data path 850, which may be over a faster network path than available to LTSS 600.

Figure 9:
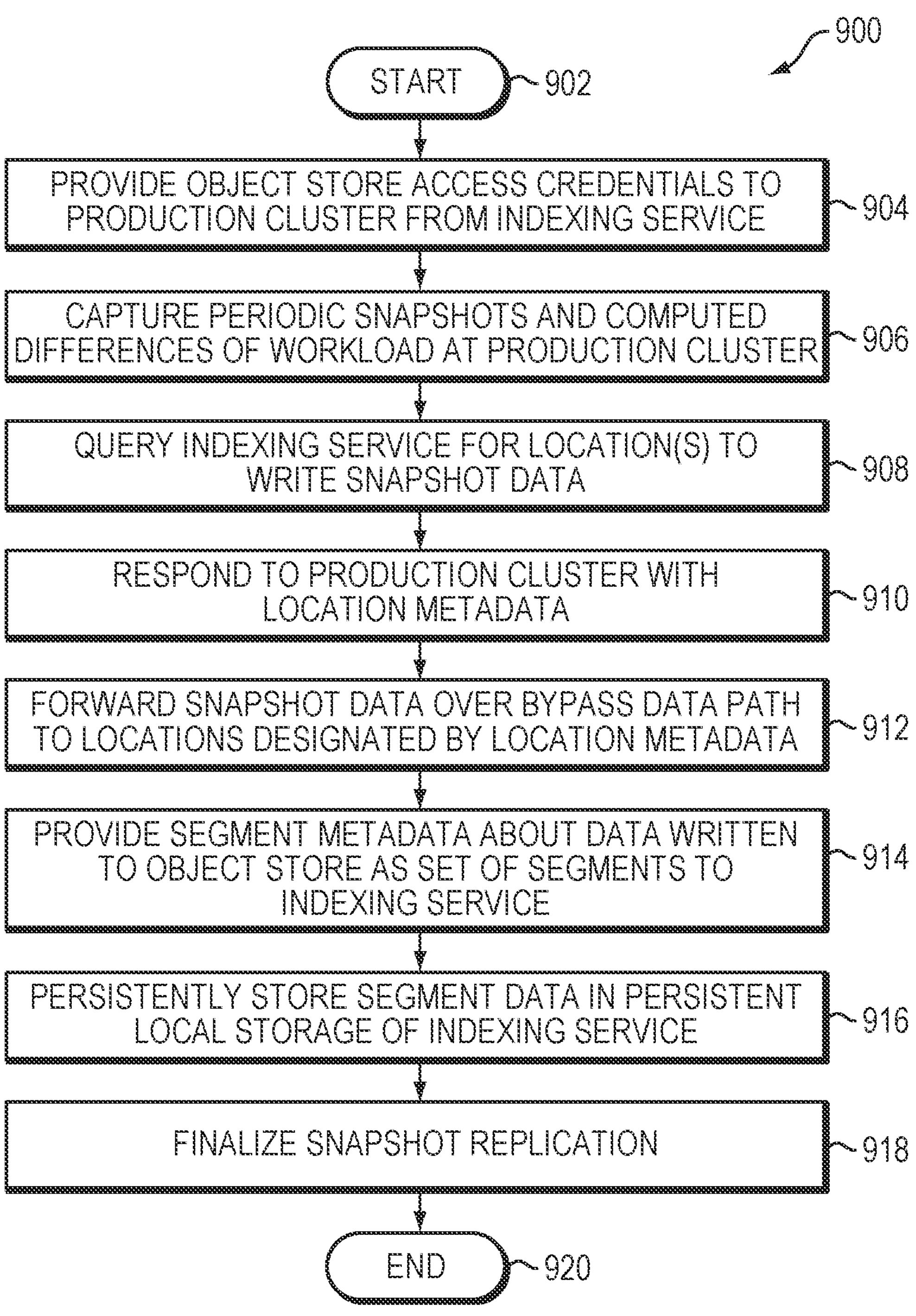
FIG. 9 is a flowchart illustrating a replication workflow procedure in accordance with the bypassing technique.

According to the bypassing technique, the direct bypass data path 850 from the on-premises and cloud clusters 810, 880 to the object store 560 bypasses the LTSS indexing service for accessing snapshot data. Notably, the indexing service of LTSS 600 is only invoked for creation of index data structures 700 and for retrieval of objects and offsets (locations within the object), but not for actual transfer of data. That is, the indexing service does not act as an intermediary in the data path for access to the object store. FIG. 9 is a flowchart illustrating a replication workflow procedure in accordance with the bypassing technique. The replication workflow procedure 900 starts at block 902 and proceeds to block 904 where the indexing service (e.g., LTSS 600) of site B provides object store access credentials to the production cluster (e.g., on-premises cluster 810) of site A over a secure channel 870. Access credentials include access keys for identifying objects and secret keys to write to/read from those objects of the object store 560 (e.g., S3 bucket). The two sites also exchange information about transformations (e.g., compression algorithms, encryption algorithms, encryption keys, etc.) to be applied on the data stored in the object store 560. Note that the transformation information (as well as the access credentials) is exchanged over the secure channel 870.

At block 906, the replication manager of the production cluster captures periodic snapshots of the workload and computes differences. At block 908, the replication manager queries the indexing service for an appropriate location (or set of locations) to write its data. At block 910, the indexing service responds with location metadata (e.g., URLs) to object(s) where such data can be written. Note that for the read path (i.e., snapshot data retrieval), the indexing service responds with location metadata that may include offsets in the object as is described in FIG. 10. Alternatively, the replication manager can write the data to a plurality of objects and subsequently provide those locations to the indexing service. At block 912, the replication manager forwards the snapshot data over the bypass data path to write the objects to locations of the object store designated by the location metadata. To that end, the replication manager performs the necessary data transformation (compression, encryption), constructs one or more object headers and cooperates with the data I/O manager to write the objects to the designated locations.

At block 914, the replication manager provides intra-object location information (e.g., segment metadata having location/offsets inside an object) to the indexing service about the data written to the object store for each specific object as, e.g., a set of segments. In an embodiment, a segment includes a data storage unit ID (e.g., virtual disk ID), offset of data in that data storage unit, length of the segment, Object ID being written to and offset within that object where the segment is written. The replication manager may batch information of multiple such segments (possibly across multiple objects) to the indexing service to reduce chatter. At block 916, the indexing service persistently stores the segment metadata in, e.g., persistent local storage. When all the data for a snapshot has been transferred, the replication manager commits/finalizes the snapshot replication using, e.g., a separate message at block 918. The replication workflow procedure then ends at block 920.

As a result, the LTSS indexing service leverages the captured segment metadata and builds an index data structure 700 on the object store 560 as described above. Note that the replication workflow procedure 900 repeats for each periodic snapshot created in the production cluster. Moreover, it is possible to perform block 904 only once for multiple such snapshots to reduce chatter in the protocol. Accordingly, data transfer to the object store occurs over the bypass data path 850 to completely bypass the LTSS indexing service for data path access to the object store during replication.

Figure 10:
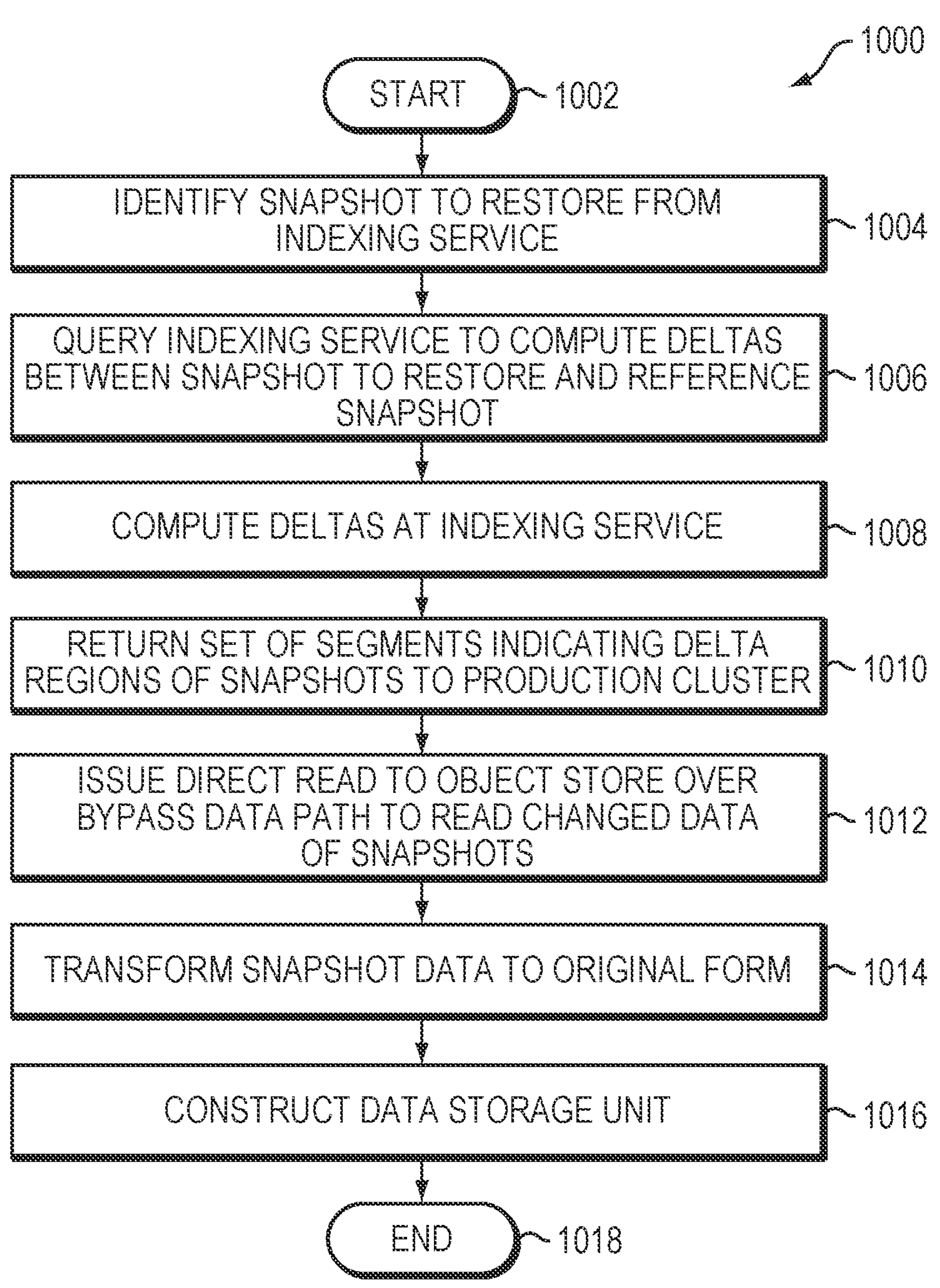
FIG. 10 is a flowchart illustrating a restore/retrieval workflow procedure in accordance with the bypassing technique.

FIG. 10 is a flowchart illustrating a restore/retrieval workflow procedure in accordance with the bypassing technique. The restore/retrieval workflow procedure 1000 starts at block 1002 and proceeds to block 1004 where the replication manager of the production cluster (e.g., cloud cluster 880) of site C identifies a snapshot to restore (transfer) from the indexing service (e.g., LTSS 600) and a common reference snapshot used to optimize data transfer using, e.g., known techniques to choose an optimal reference snapshot. At block 1006, the replication manager queries the indexing service to compute the changes or differences (deltas) between the snapshot to be restored and the reference snapshot. At block 1008, the indexing service computes the deltas (changes) using, e.g., a known B+ tree diffing technique.

At block 1010, the indexing service returns a set of segments that indicates the changed, delta regions between the two snapshots to the production cluster. As noted, a segment includes a data storage unit ID, offset of data in that data storage unit, length of the segment, Object ID hosting that segment and offset within that object where the segment is located. Note that if there is no common reference snapshot between the production cluster and the indexing service, the indexing service returns all the segments of the snapshot data to be restored. At block 1012, the replication manager issues a direct read to the object store to read changed regions (data) of the snapshots. Illustratively, the replication manager cooperates with the data I/O manager to issue a direct read over the bypass data path to the object store to read the changed snapshot data of the objects. As described in the replication workflow procedure 900, the production cluster initially obtains access credentials to the object store/bucket over a secure channel (similar to secure channel 870), which enables the replication manager to directly read the data from the objects. At block 1014, the replication manager transforms (using the transformation information) the snapshot data to its original form and, at block 1016, constructs the data storage unit (e.g., a virtual disk). The restore/retrieval workflow procedure then ends at block 1018.

Notably, the bypassing technique described herein results in reduced (i) data processing resource consumption and associated costs by LTSS acting as intermediary in the data path access to the object store, e.g., fetch snapshot data from the object store and return the data to the production cluster for restore operations, as well as (ii) data access latency. Moreover, for data retrieval operations, the technique results in reduced data processing resources and cost associated with computing differences and locations of the snapshot data stored in the object store.

Previous bypassing solutions include pNFS protocol and Cluster Store Volumes (CSV—a Windows Failover Cluster feature) deployments, both of which exhibit only rudimentary similarities and have significant differences to the bypassing technique described herein. For example, the pNFS/CSV deployments are file-oriented (NAS-orientated) protocols that provide file-oriented requests to a metadata server which returns block access information to satisfy the request by the client directly accessing block-oriented storage. That is, pNFS/CSV only understand file-oriented requests and perform block-oriented access to block storage to satisfy those requests much like a conventional file system. In contrast, the bypass technique described herein uses block-orient requests that are satisfied by access to object-based (e.g., Amazon S3) data. In this manner both the type of request (file-oriented vs. block oriented) and translation (file request to block access vs block request to object access) are of a different kind from pNFS/CVS.

Advantageously, the bypassing technique allows a client to transmit its data only once, e.g., to the object store and avoid multiple (e.g., 2) data access "hops," e.g., a first hop to the indexing service (LTSS) acting as an intermediary which access the object store as a second hop. By eliminating multiple (e.g., one of the two) hops and transferring/retrieving data directly from the object store, the bypassing technique reduces the transfer of large amounts of data to the indexing service, while increasing performance (e.g., reducing latency and increasing throughput as well as scalability) for write/read accesses.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a primary site, access credentials and location metadata of an object store from an indexing service running on an intermediate site of a multi-site data replication environment, the location metadata configured to locate snapshot data stored on one or more objects of the object store, wherein the one or more objects are identified and accessed according to the access credentials;

writing the snapshot data from the primary site over a data path configured to bypass the indexing service to the one or more objects of the object store located by the location metadata; and forwarding segment metadata having a location and offset of the snapshot data inside each of the one or more objects from the primary site to the indexing service for subsequent retrieval of the snapshot data, the indexing service configured to map the location and offset of the snapshot data to the location metadata of the object store according to an address space of the snapshot data at the primary site.

2. The method of claim 1 wherein the access credentials include secret keys for authorizing access to the one or more objects of the object store.

3. The method of claim 1 wherein receiving the access credentials further comprises receiving transformation information provided by the indexing service at the primary site, the transformation information including one of compression algorithms, encryption algorithms, or encryption keys applied on the snapshot data stored in the object store.

4. The method of claim 1 further comprising capturing the snapshot data via periodic snapshots at the primary site according to a recovery point objective.

5. The method of claim 1 further comprising packing the snapshot data into the one or more objects according to a preferred size of the one or more objects of the object store.

6. The method of claim 5 wherein the packing the snapshot data further comprises constructing one or more object headers to write the one or more objects.

7. The method of claim 1 further comprising providing the segment metadata to the indexing service about the snapshot data written to the object store for each object as a set of segments.

8. The method of claim 7 wherein a segment includes a data storage unit identifier (ID), an offset of the data in a data storage unit identified by the data storage unit ID, a length of the segment, an object ID of an object, and an offset within the object for the segment.

9. The method of claim 1 further comprising restoring the snapshot data at the primary site from the object store by querying the indexing service for a set of segments that identifies the snapshot data within a delta region between a common reference snapshot and a current snapshot.

10. The method of claim 9, wherein if there is no common reference snapshot between the primary site and the indexing service, the indexing service returns all segments of the restored snapshot data.

11. A non-transitory computer readable medium including program instructions for execution on a processor, the program instructions configured to:

receive, at a primary site access credentials and location metadata of an object store from an indexing service running on an intermediate site of a multi-site data replication environment, the location metadata configured to locate snapshot data stored on one or more objects of the object store, wherein the one or more objects are identified and accessed according to the access credentials;

write the snapshot data from the primary site over a data path configured to bypass the indexing service to the one or more objects of the object store located by the location metadata; and forward segment metadata having a location and offset of the snapshot data inside each of the one or more objects from the primary site to the indexing service for subsequent retrieval of the snapshot data, the indexing service configured to map the location and offset of the snapshot data to the location metadata of the object store according to an address space of the snapshot data at the primary site.

12. The non-transitory computer readable medium of claim 11, wherein the access credentials include secret keys for authorizing access to the one or more objects of the object store.

13. The non-transitory computer readable medium of claim 11, wherein the program instructions configured to receive the access credentials are further configured to receive transformation information provided by the indexing service at the primary site, the transformation information including one of compression algorithms, encryption algorithms, or encryption keys applied on the snapshot data stored in the object store.

14. The non-transitory computer readable medium of claim 11 wherein the program instructions are further configured to capture the snapshot data via periodic snapshots at the primary site according to a recovery point objective.

15. The non-transitory computer readable medium of claim 11, wherein the program instructions are further configured to pack the snapshot data into the one or more objects according to a preferred size of the one or more objects of the object store.

16. The non-transitory computer readable medium of claim 15, wherein the program instructions configured to pack the snapshot data are further configured to construct one or more object headers to write the one or more objects.

17. The non-transitory computer readable medium of claim 11, wherein the program instructions are further configured to provide the segment metadata to the indexing service about the snapshot data written to the object store for each object as a set of segments.

18. The non-transitory computer readable medium of claim 17, wherein a segment includes a data storage unit identifier (ID), an offset of the data in a data storage unit identified by the data storage unit ID, a length of the segment, an object ID of an object, and an offset within the object for the segment.

19. The non-transitory computer readable medium of claim 11 wherein the program instructions are further configured to restore the snapshot data at the primary site from the object store by querying the indexing service for a set of segments that identifies the snapshot data within a delta region between a common reference snapshot and a current snapshot.

20. The non-transitory computer readable medium of claim 19, wherein if there is no common reference snapshot between the primary site and the indexing service, the indexing service returns all segments of the restored snapshot data.

21. An apparatus comprising:

a network connecting a first node of a primary site to an intermediate site, the first node having a processor configured to execute program instructions configured to:

receive access credentials and location metadata of an object store from an indexing service running on an intermediate site of a multi-site data replication environment, the location metadata configured to locate snapshot data stored on one or more objects of the object store, wherein the one or more objects are identified and accessed according to the access credentials;

write the snapshot data from the primary site over a data path configured to bypass the indexing service to the one or more objects of the object store located by the location metadata; and send segment metadata having a location and offset of the snapshot data inside each of the one or more objects from the primary site to the indexing service for subsequent retrieval of the snapshot data, the indexing service configured to map the location and offset of the snapshot data to the location metadata of the object store according to an address space of the snapshot data at the primary site.

22. The apparatus of claim 21, wherein the access credentials include secret keys for authorizing access to the one or more objects of the object store.

23. The apparatus of claim 21, wherein the program instructions configured to receive the access credentials are further configured to receive transformation information provided by the indexing service at the primary site, the transformation information including one of compression algorithms, encryption algorithms, or encryption keys applied on the snapshot data stored in the object store.

24. The apparatus of claim 21 wherein the program instructions are further configured to capture the snapshot data via periodic snapshots at the primary site according to a recovery point objective.

25. The apparatus of claim 21, wherein the program instructions are further configured to pack the snapshot data into the one or more objects according to a preferred size of the one or more objects of the object store.

26. The apparatus of claim 25, wherein the program instructions configured to pack the snapshot data are further configured to construct one or more object headers to write the one or more objects.

27. The apparatus of claim 21, wherein the program instructions are further configured to provide the segment metadata to the indexing service about the snapshot data written to the object store for each object as a set of segments.

28. The apparatus of claim 27, wherein a segment includes a data storage unit identifier (ID), an offset of the data in a data storage unit identified by the data storage unit ID, a length of the segment, an object ID of an object, and an offset within the object for the segment.

29. The apparatus of claim 21 wherein the program instructions are further configured to restore the snapshot data at the primary site from the object store by querying the indexing service for a set of segments that identifies the snapshot data within a delta region between a common reference snapshot and a current snapshot.

30. The apparatus of claim 29, wherein if there is no common reference snapshot between the primary site and the indexing service, the indexing service returns all segments of the restored snapshot data.

* * * * *